United States Patent
Kim (10) Patent No.: US 10,834,018 B2
(45) Date of Patent: Nov. 10, 2020

(54) DISTRIBUTED COMPUTING ACCELERATION PLATFORM AND DISTRIBUTED COMPUTING ACCELERATION PLATFORM OPERATION METHOD

(71) Applicant: SK TELECOM CO., LTD., Seoul (KR)

(72) Inventor: Dong Hyun Kim, Seoul (KR)

(73) Assignee: SK TELECOM CO., LTD., Seoul (KR)

(*) Notice: Subject to any disclaimer, the term of this patent is extended or adjusted under 35 U.S.C. 154(b) by 44 days.

(21) Appl. No.: 16/114,716

(22) Filed: Aug. 28, 2018

(65) Prior Publication Data
US 2019/0068520 A1    Feb. 28, 2019

(30) Foreign Application Priority Data
Aug. 28, 2017    (KR) .................. 10-2017-0108923

(51) Int. Cl.
*H04L 12/911*    (2013.01)
*H04L 29/08*    (2006.01)
*G06T 1/20*    (2006.01)

(52) U.S. Cl.
CPC .............. *H04L 47/783* (2013.01); *G06T 1/20* (2013.01); *H04L 67/10* (2013.01); *H04L 67/1031* (2013.01)

(58) Field of Classification Search
CPC ........ G06T 1/20; H04L 67/10; H04L 67/1031
USPC ....................................................... 709/226
See application file for complete search history.

(56) References Cited

U.S. PATENT DOCUMENTS

| | | | | |
|---|---|---|---|---|
| 10,142,403 | B1* | 11/2018 | Prieditis | .................. G06F 17/16 |
| 2004/0049609 | A1* | 3/2004 | Simonson | ............... G06F 9/541 710/8 |
| 2005/0267930 | A1* | 12/2005 | Wybenga | ............ G06F 9/30123 709/201 |
| 2012/0166514 | A1* | 6/2012 | Mathew | .................. G06F 9/505 709/201 |
| 2013/0159452 | A1* | 6/2013 | Saldana De Fuentes | ..................... G06F 15/167 709/213 |

(Continued)

FOREIGN PATENT DOCUMENTS

| KR | 10-2006-0045952 A | 5/2006 |
|---|---|---|
| KR | 10-2015-0084098 A | 7/2015 |

OTHER PUBLICATIONS

Korean Office Action dated Jun. 14, 2018, in connection with the Korean Patent Application No. 10-2017-0108923.

*Primary Examiner* — David P Zarka
(74) *Attorney, Agent, or Firm* — Hauptman Ham, LLP (57) ABSTRACT

An apparatus for a distributed computing acceleration platform, comprises an edge computing node comprising a processor and a first data storage configured to store a first data set for performing a plurality of processing functions by the processor, a core computing node comprising a first resource including a plurality of processing-dedicated processors, a second resource including a plurality of high-speed operation processors, and a second storage configured to store a second data set for performing the plurality of processing functions by the plurality of processing-dedicated processors, and a control node configured to implement a particular service, using a particular processing function among the plurality of processing functions, in the core computing node and the edge computing node.

9 Claims, 4 Drawing Sheets

(56) References Cited

U.S. PATENT DOCUMENTS

| | | | |
|---|---|---|---|
| 2015/0199214 A1* | 7/2015 | Lee | G06F 9/505 |
| | | | 718/102 |
| 2015/0256435 A1* | 9/2015 | Sum | G01R 25/00 |
| | | | 702/62 |
| 2015/0333978 A1* | 11/2015 | Wu | H04L 67/10 |
| | | | 709/226 |
| 2016/0156575 A1* | 6/2016 | Jeong | H04L 51/10 |
| | | | 709/206 |
| 2017/0235616 A1* | 8/2017 | Baughman | H04L 67/12 |
| | | | 718/104 |
| 2018/0241623 A1* | 8/2018 | Ma | H04L 41/0803 |

* cited by examiner

DISTRIBUTED COMPUTING ACCELERATION PLATFORM AND DISTRIBUTED COMPUTING ACCELERATION PLATFORM OPERATION METHOD

CROSS-REFERENCE TO RELATED APPLICATIONS

This application is based upon and claims the benefit of priority from Korean Patent Application No. 10-2017-0108923, filed on Aug. 28, 2017, the entire contents of which are incorporated herein by reference.

BACKGROUND OF THE INVENTION

1. Field of the Invention

The present disclosure relates to cloud service (or cloud computing) technology. More specifically, the present disclosure relates to technology for realizing computing acceleration in a distributed cloud service environment in which an edge network and a core network distributedly provide a cloud service.

2. Description of the Prior Art

A cloud service (or cloud computing) is technology for providing a data service based on Information Technology (IT) resources virtualized over the network using Internet technology. The cloud service has a concept of leasing a required amount of IT resources, such as a function (process) for processing various operations including data classification, calculation, processing, and analysis and a storage space.

Accordingly, the cloud service can perform processing on voluminous data at a high speed, which cannot be processed at a level of actually possessed resources. The cloud service allows users to use a high-performance/high-speed data service based thereon.

However, the conventional cloud service corresponds to a static structure using the limited resources of a server implemented on the network in order to provide the cloud service and thus has a structural limit in that flexible resource association (linkage) is not possible.

Therefore, recently, research on the resource association (linkage) between an edge and a core network is conducted by implementing a hybrid service environment (hereinafter, referred to as a distributed cloud service environment) in which the core network and the edge, located closer to a user (terminal) than the core network, provide the cloud service.

Meanwhile, in order to meet needs for ultra-reliable low-latency data service, it is necessary to variously change/operate the distributed cloud service environment.

The present disclosure proposes new technology for implementing computing acceleration for ultra-reliable low-latency service in a distributed cloud service environment in which the cloud service is provided by the edge and the core network beyond simple resource association (linkage).

SUMMARY OF THE INVENTION

An aspect of the present disclosure is to realize technology for managing and operating new hardware resources for implementing computing acceleration in a distributed cloud service environment.

In accordance with an aspect of the present disclosure, an apparatus for a distributed computing acceleration platform is provided. The apparatus includes: an edge computing node including processors; a core computing node including a first resource including a plurality of processing-dedicated processors of which a processing function can be reset and a second resource including a plurality of high-speed operation processors; and a control node configured to implement a particular service in the core computing node and the edge computing node, wherein the control node sets a particular processing function for the particular service in a processor included in the edge computing node and a processor included in at least one of the first resource and the second resource of the core computing node and implement a service function to be operated on the particular processing function.

Specifically, the edge computing node may include at least one of a processing-dedicated Field-Programmable Gate Array (FPGA) card, of which the processing function can be reset, and a high-speed-operation Graphic Processing Unit (GPU).

Specifically, in the core computing node, the first resource may include a plurality of processing-dedicated FPGA cards of which the processing function can be reset, and has a fabric structure in which each FPGA card is selectively connected to at least one other FPGA card, and the second resource may have a cluster structure including a plurality of high-speed operation GPU cards and has a cluster structure.

Specifically, the control node may be configured to set at least one of a first processing function for processing acceleration, a second processing function for security between the core computing node and the edge computing node, and a third processing function for processing voluminous data in at least one processor included in the first resource of the core computing node and the processor of the edge computing node.

Specifically, the control node may be configured to set at least one processor in the second resource of the core computing node for high-speed operation of voluminous data processing according to the third processing function.

Specifically, the edge computing node may be configured to select a portion of the data generated for the particular service, perform processing of the portion of data, and transfer data other than the portion of the data to the core computing node.

Specifically, the processing performed by the edge computing node may be changed according to a distribution policy set based on at least one of a functional range of a cloud service supported by a local storage space linked to the edge computing node, the type of the particular service, the amount of processing required for the particular service, and the service speed.

In accordance with another aspect of the present disclosure, a method of operating a distributed computing acceleration platform is provided. The method includes: identifying information on a particular service; a selection step of selecting processors from a core computing node including a first resource including a plurality of processing-dedicated processors of which a processing function can be reset and a second resource including a plurality of high-speed operation processors and an edge computing node including processors based on the information on the particular service; a processing-function-setting step of setting a particular processing function for the particular service in the processor selected from the core computing node and the processor selected from the edge computing node; and a service function implementation step of implementing the particular service in the core computing node and the edge computing node by implementing a service function to be operated on the particular processing function.

Specifically, the selection step may include selecting at least one processor from the first resource and the second resource of the core computing node and selecting at least one processor from the edge computing node according to a required function of the particular service identified from the information on the particular service.

Specifically, the processing-function-setting step may include: setting at least one of a first processing function for processing acceleration, a second processing function for security between the core computing node and the edge computing node, and a third processing function for processing voluminous data in the at least one processor selected from the first resource of the core computing node; and setting the at least one processor selected from the second resource of the core computing node for high-speed operation of voluminous data processing according to the third processing function.

Specifically, the processing-function-setting step may include setting at least one of a first processing function for processing acceleration and a second processing function for security between the core computing node and the edge computing node in the at least one processor selected from the edge computing node.

Specifically, the service function implementation step may include: allocating a network function and a storage for the particular service to each of the core computing node and the edge computing node; and installing a service function to be operated using the network function and the storage on the particular processing function in each of the core computing node and the edge computing node.

According to embodiments of the present disclosure, it is possible to implement computing acceleration in a distributed cloud service environment in which a cloud service is provided by an edge and a core network.

According to embodiments of the present disclosure, it is possible to derive an effect of providing ultra-reliable low-latency data service and network service by implementing computing acceleration in a distributed cloud service environment.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described with reference to the accompanying drawings.

Figure 1:
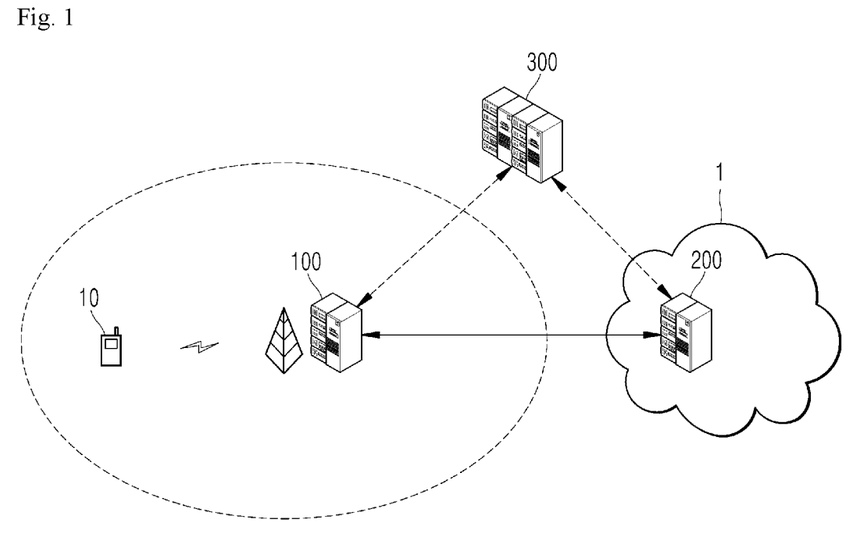
FIG. 1 is a diagram illustrating a distributed cloud service environment to which the present disclosure is applied.

FIG. 1 illustrates a distributed cloud service environment to which the present disclosure is applied.

The present disclosure relates to a cloud service (or cloud computing) that fundamentally provides a data service based on Information Technology (IT) resources virtualized on the network.

Particularly, the present disclosure relates to a hybrid service environment (hereinafter, referred to as a distributed cloud service environment) in which a core network or an edge located closer to a user (terminal) than the core network, provides a cloud service.

As illustrated in FIG. 1, the distributed cloud service environment includes a user, that is, a terminal 10, a core computing node 200 located in a core network 1, and an edge computing node 100 located between the terminal 10 and the core computing node 200.

The core computing node 200 provides a cloud service by performing data processing related to an application executed by the terminal 10.

The edge computing node 100 selectively performs some data processing among data processing related to the application executed by the terminal 10 and provides core computing node and edge computing nodes the cloud service together with the core computing node 200.

The conventional cloud service environment corresponds to a static structure using the limited resources of the server implemented on the network in order to provide the cloud service and thus has a structural limit in that flexible resource association (linkage) is not possible.

Further, the conventional cloud service environment has service latency due to the physical distance between the user (terminal) and the server (virtual resources).

Accordingly, the conventional cloud service environment has difficulty in providing for ultra-reliable low-latency data service, due to long physical di stances and a structural limit in which flexible resource association (linkage) is not possible.

However, in the distributed cloud service environment according to the present disclosure, the edge and the core network provide the cloud service in a distributed manner, so that service latency due to physical distance and a structural limit is improved by flexible resource association (linkage) and thus ultra-reliable low-latency data service can be provided in some degree.

Meanwhile, in order to meet needs for the ultra-reliable low-latency data service, it is necessary to variously change/operate the distributed cloud service environment.

The present disclosure proposes new technology for implementing computing acceleration for ultra-reliable low-latency service in a distributed cloud service environment in which the cloud service is provided by the edge and the core network beyond simple resource association (linkage).

Specifically, the present disclosure proposes a distributed computing acceleration platform for implementing technology to manage and operate hardware resources for computing acceleration in a distributed cloud service environment.

The distributed computing acceleration platform proposed by the present disclosure includes the edge computing node 100, the core computing node 200, and a control node 300 configured to manage and operate hardware/software resources of the edge computing node 100 and the core computing node 200.

The edge computing node 100 includes processors (processing H/W) as hardware resources that can be managed and operated by the control node 300.

The core computing node 200 includes processors (processing H/W) as hardware resources that can be managed and operated by the control node 300.

Hereinafter, a hardware resource pool provided by an apparatus for a distributed computing acceleration platform according to the present disclosure will be conceptually described with reference to FIG. 2.

Figure 2:
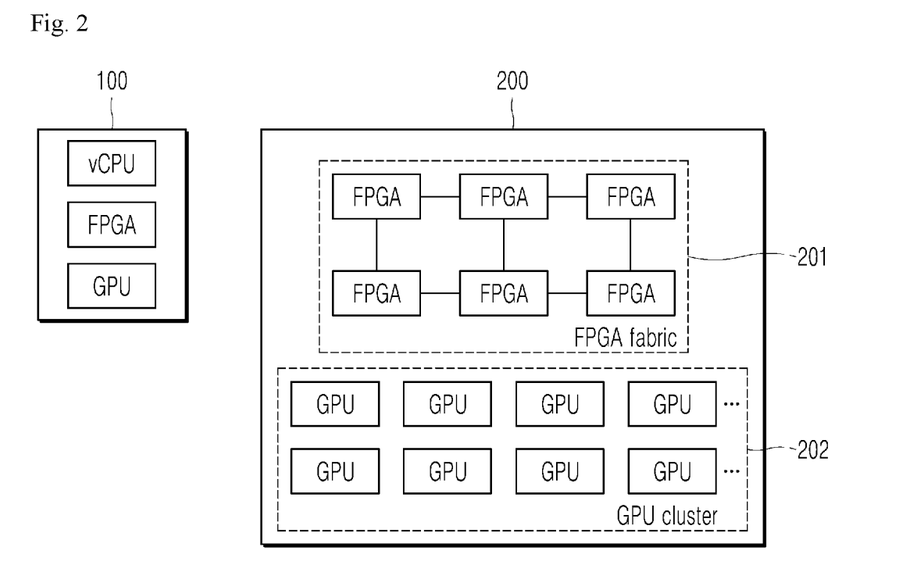
FIG. 2 illustrates a hardware resource pool provided by an apparatus for a distributed computing acceleration platform according to an embodiment of the present disclosure.

As illustrated in FIG. 2, the edge computing node 100 includes a processor as hardware resources that can be managed and operated by the control node 300.

According to an embodiment, the edge computing node 100 includes at least one of a processing-dedicated Field-Programmable Gate Array (FPGA) card by which processing function can be reset, and a high-speed-operation Graphic Processing Unit (GPU) card.

Further, the edge computing node 100 may include a virtual Central Processing Unit (vCPU).

As illustrated in FIG. 2, the core computing node 200 includes processors as hardware resources that can be managed and operated by the control node 300.

According to an embodiment, the core computing node 200 includes a first resource 201 including a plurality of processing-dedicated processors (for example, FPGA cards) of which a processing function can be reset and a second resource 202 including a plurality of processors (for example, high-speed-operation GPU cards).

In the core computing node 200, the first resource 201 includes a plurality of processing-dedicated FPGA cards of which a processing function can be reset, and may have a fabric structure in which each FPGA card is selectively connected to at least one other FPGA card.

As described above, when the first resource 201 in the core computing node 200 has the fabric structure in which FPGA cards are selectively connected to each other, one or more FPGA cards, which are hardware resources, are used to implement a single host for providing a particular service according to the requirements of the particular service, and thus the host structure can be implemented in a variable manner, rather than statically.

Further, in the core computing node 200, the second resource 202 may have a cluster structure including a plurality of high-speed-operation GPU cards.

When the second resource 202 in the core computing node 200 has the cluster structure of GPU cards, the GPU cards, which are hardware resources, are clustered to form an operation space of voluminous data for a particular service according to the requirements of the particular service, and thus the data operation space can be implemented in a variable manner, rather than statically.

Therefore, the distributed computing acceleration platform according to an embodiment of the present disclosure realizes technology for managing and operating hardware resources for computing acceleration based on a hard resource pool with a structure in which the resources can be implemented in a variable manner, rather than statically, as illustrated in FIG. 2.

The control node 300 is a node for managing and operating hardware/software resources of the edge computing node 100 and the core computing node 200, and may be a Virtual Infrastructure Manager (VIM) for managing and operating physical/virtual resources based on cloud technology.

The control node 300 sets a particular processing function for a particular service in the processor included in at least one of the first resource and the second resource of the core computing node 200 and the processor of the edge computing node 100 and implements the service function executed on the particular processing function, so as to provide a service environment in which the particular service is performed in the core computing node 200 and the edge computing node 100.

According to an embodiment, the control node 300 may set at least one of a first processing function for processing acceleration, a second processing function for security between the core computing node 200 and the edge computing node 100, and a third processing function for voluminous data processing in the FPGA card included in the first resource 201 of the core computing node 200 and the FPGA card of the edge computing node 100.

Here, the processing function set in the FPGA card is a function that a particular hardware chip (a card or a device) has.

Specifically, the first function for processing acceleration may be a function of a particular hardware chip (a card or a device) used for processing acceleration, for example, an Open vSwitch (OVS) or OVS+Data Plane Development Kit (DPDK).

Further, the second processing function for security between the core computing node 200 and the edge computing node 100 may be a function of a particular hardware chip (a card or a device) used for security, for example, an IP security protocol (IPSEC).

The third processing function for voluminous data processing may be a function of a particular hardware chip (a card or a device) used for voluminous data processing, for example, Machine Learning (ML) or Deep Learning (DL).

That is, the control node 300 may set at least one of the first processing function (for example, OVS or OVS+DPDK) for processing acceleration, the second processing function (for example, IPSEC) for security between the core computing node 200 and the edge computing node 100, and the third processing function (for example, ML or DL) for voluminous data processing in the FPGA card included in the first resource 201 of the core computing node 200 and the FPGA card of the edge computing node 100.

Further, the control node 300 may set at least one GPU card in the second resource 202 of the core computing node 200 for high-speed operation of voluminous data processing according to the third processing function (for example, ML or DL).

Specifically, the control node 300 may use at least one GPU card in the second resource 202 of the core computing node 200 to set a voluminous data processing engine according to ML or DL set in the FPGA card of the first resource 201.

Hereinafter, it will be described with reference to FIG. 3 that the apparatus for the distributed computing acceleration platform according to an embodiment of the present disclosure manages and operates resources on the basis of a hardware resource pool will be described with reference to FIG. 3.

The control node 300 may implement a server for providing a particular service in the distributed computing acceleration platform according to the present disclosure, in the core computing node 200 and the edge computing node 100.

First, the control node 300 identifies information for implementing the server for the particular service.

At this time, the information on the particular service identified by the control node 300 may include all pieces of information for implementing the particular service. For example, the information on the particular service may include information on functions required for implementing the particular service such as HW capability information indicating how many and what processors are selected from the core computing node 200 and the edge computing node 100 and how each processor is set, and HW setting information suitable for the HW capability.

The information on the particular service may be information input by the entity (ex. computer, operator, etc.) that designs the server implementation.

Hereinafter, for convenience of description, the information on the particular service identified by the control node 300 is referred to as service setting information.

The control node 300 may identify information (service setting information) for implementing the server for the particular service, for example, by receiving the service setting information.

The control node 300 selects a processor from the core computing node 200 and the edge computing node 100 on the basis of the information on the particular service, that is, the service setting information.

That is, the control node 300 selects at least one processor from the first resource 201 and the second resource 202 of the core computing node 200 and at least one processor of the edge computing node 100 according to a function for implementing the particular service identified on the basis of the service setting information.

Figure 3:
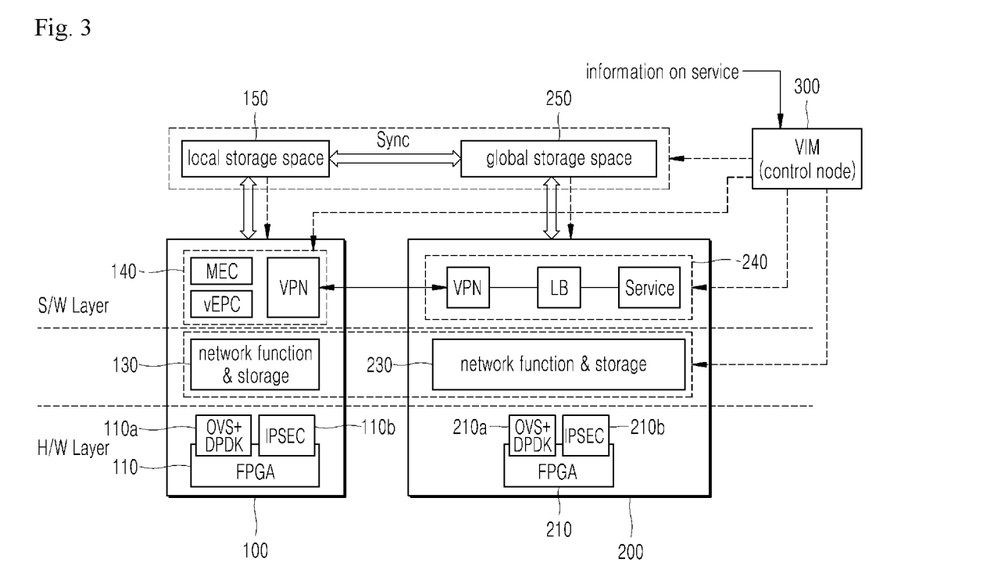
FIG. 3 illustrates a structure in which the apparatus for the distributed computing acceleration platform manages and operates resources on the basis of the hardware resource pool according to an embodiment of the present disclosure.

For example, the control node 300 selects one FPGA card 210 from the first resource 201 of the core computing node 200 and the FPGA card 110 from the edge computing node 100 in FIG. 3.

The control node 300 sets a particular processing function for the particular service in the selected processors, that is, the FPGA card 210 of the core computing node 200 and the FPGA card 110 of the edge computing node 100.

That is, the control node 300 may set at least one of the first processing function (for example, OVS or OVS+DPDK) for processing acceleration, the second processing function (for example, IPSEC) for security between the core computing node 200 and the edge computing node 100, and the third processing function (for example, ML or DL) for voluminous data processing in at least one processor, that is, the FPGA card 210 selected from the first resource 201 of the core computing node 200, according to the required function of the particular service.

Further, when the processor is selected from the second resource 202 of the core computing node 200, the control node 300 may use at least one processor selected from the second resource 202, that is, the GPU card, to set a voluminous data processing engine according to ML or DL set in the FPGA card of the first resource 201.

In addition, the control node 300 may set at least one of the first processing function (for example, OVS or OVS+DPDK) for processing acceleration and the second processing function (for example, IPSEC) for security between the core computing node 200 and the edge computing node 100 in at least one processor, that is, the FPGA card 110 selected from the edge computing node 100 according to the function of requiring the particular service.

As illustrated in FIG. 3, the core computing node 200 may provide the cloud service together with the edge computing node 100 on the basis of a global storage space 250 located on the core network 1.

According to the present disclosure, the global storage space 250 may include a data set (hereinafter, referred to as an Intellectual Property (IP) image) required for implementing a plurality of hardware chips (cards or devices), for example, an OVS function, an OVS+DPDK function, or an IPSEC function to be set in the FPGA card. In addition, the global storage space 250 may include a data set (hereinafter, referred to as workload) required for implementing an engine to be set in the GPU card, for example, an ML engine or a DL engine.

Accordingly, when the control node 300 sets the processing function in the FPGA card or the GPU card in the core computing node 200, the control node 300 allows the core computing node 200 to acquire the IP image of the processing function stored in the global storage space 250 and set the processing function. Alternatively, the control node 300 may allow to set up the workload of the corresponding processing function.

The edge computing node 100 may provide the cloud service together with the core computing node 200 based on a local storage space located on the edge side. Specifically, a local storage space 150 is located in a base station through which the terminal 10 accesses to the core network 1.

The local storage space 150 may store data provided from the global storage space 250 or data generated by itself according to a predefined retention policy.

Accordingly, when the control node 300 sets the processing function in the FPGA card or the GPU card in the edge computing node 100, the control node 300 allows the edge computing node 100 to acquire the IP image of the processing function stored in the local storage space 150 and set the processing function. Alternatively, the control node 300 may allow to set up the workload of the corresponding processing function When the IP image of the corresponding processing function is not stored in the local storage space 150, the control node 300 may control to move the IP image of the corresponding processing function and/or the workload of the corresponding processing function from the global storage space 250 to the local storage space 150 and then allows the edge computing node 100 to obtain the IP image of the corresponding processing function stored in the local storage space 150 and set the corresponding processing function for setting the processing function in the FPGA card or the GPU card of the edge computing node 100. Alternatively, the control node 300 may allow to set up the workload of the corresponding processing function.

In FIG. 3, the control node 300 sets OVS+DPDK 210a and IPSEC 210b in the FPGA card 210 selected from the first resource 201 of the core computing node 200 and sets OVS+DPDK 110a and IPSEC 110b in the FPGA card 110 selected from the edge computing node 100.

As is known from the above description, according to an embodiment of the present disclosure, it is possible to flexibly and variously design (set) hardware resources of the server implemented in the core computing node 200 and the edge computing node 100 on the basis of the hardware resource pool with a structure that can be operated in a various manner, rather than statically.

When the hardware resources of the server are designed by setting a particular processing function in the processors of the core computing node 200 and the edge computing node 100 as described above, the control node 300 implements service function that operates on the set particular processing function may be implemented, so that a service environment in which the particular service is implemented in the core computing node 200 and the edge computing node 100 may be provided.

Specifically, the control node 300 allocates network functions and storages 130 and 230 for the particular service to each of the core computing node 200 and the edge computing node 100.

The network function is for allowing network communication by which each of the core computing node 200 and the edge computing node 100 provides the particular service. The storage function is for supporting a link between the network communication and its own storage space 150 or 250.

Further, the control node 300 may install a service function to be operated using the network function and the storage on the particular processing function in each of the core computing node 200 and the edge computing node 100.

Specifically, the control node 300 installs, in the core computing node 200, a service function 240 to be operated using the network function and the storage 230 on the particular processing function, that is, OVS+DPDK 210*a* and IPSEC 210*b* of the FPGA card 210.

In FIG. 3, most services for providing a particular service, a Virtual Private Network (VPN) and Load Balancing (LB) is installed as the service function 240 to be operated using the network function and the storage 230 on OVS+DPDK 210*a* and IPSEC 210*b* of the FPGA card 210.

Further, the control node 300 installs, in the edge computing node 100, a service function 140 to be operated using the network function and the storage 130 on the particular processing function, that is, OVS+DPDK 110*a* and IPSEC 110*b* of the FPGA card 110.

In FIG. 3, Mobile Edge Computing (MEC), Virtual Evolved Packet Core (vEPC), and VPN are installed as the service function 140 to be operated using the network function and the storage 130 on OVS+DPDK 110*a* and IPSEC 110*b* of the FPGA card 110.

As described above, according to an embodiment of the present disclosure, it is possible to flexibly and variously design (set) hardware resources of the server (particular service) implemented on the basis of a hardware resource pool with a structure which can be operated in a various manner, rather than statically. In addition, according to an embodiment of the present disclosure, service functions are implemented on the flexibly designed hardware resources.

According to an embodiment of the present disclosure, it is possible to provide a distributed cloud service environment realized in the core computing node 200 and the edge computing node 100 by designing flexible hardware resources and implementing flexible services (service functions).

Then, it is possible to flexibly and variously design (set) hardware resources and accelerate network offload and computation such as processing/calculations based on the design (setting), unlike the conventional cloud service environment in which hardware resources are fixed, so that the distributed cloud service environment may implement more innovative computing acceleration and accommodate the Ultra-Reliable Low-Latency communications (URLLC) scenario of 5G.

When the user installs an application related to a particular service newly designed and implemented in the core computing node 200 and the edge computing node 100 in the terminal 10 and executes the installed application, the user can use a high-speed cloud service due to the particular service supported by the core computing node 200 and the edge computing node 100.

Particularly, according to an embodiment of the present disclosure, the edge computing node 100 selects a portion of the data generated for the particular service, processes the selected portion of the data, and transfers data other than the portion of the data to the core computing node 200.

Through the selection and processing of the portion of the data generated for the particular service, the edge computing node 100 may selectively perform data processing for the portion of the data, among all data processing, with respect to to the application of the particular service executed by the terminal 10.

The core computing node 200 may process the data transmitted from the edge computing node 100 among the data generated for the particular service. Thus, the core computing node 200 may perform data processing for data other than the portion of the data processed by the edge computing node 100 with respect to the application of the particular service executed by the terminal 10.

Further, according to an embodiment of the present disclosure, the data processing for the portion of the data selectively performed by the edge computing node 100 may be changed according to a distribution policy. The distribution policy is set on the basis of at least one of a functional range of the cloud service supported by the local storage space 150 linked to the edge computing node 100, the type of the particular service, the amount of calculations required for the particular service, and the service speed.

Accordingly, data selected (or filtered) from the data generated for the particular service by the edge computing node 100 may be changed according to how the distribution policy is set, and as a result, the cloud service function, performed by the edge computing node 100 may be changed.

As described above, the distribution policy which influences data filtering of the edge computing node 100 may be set on the basis of at least one of the functional range of the cloud service supported by data stored in the local storage space 150, the amount of calculations required for the particular service, and the service speed.

However, as the functional range of the cloud service supported by the data stored in the local storage space 150 is wider, the distribution policy may be set to perform a larger amount of data processing by the edge computing node 100 compared to the case in which the functional range is narrower.

Further, as the type of the particular service corresponds to a service for which a real-time guarantee is more important, the distribution policy may be set to perform a larger amount of data processing by the edge computing node 100 compared to the opposite case.

In addition, as the amount of calculations required for the particular service is smaller, the distribution policy may be set to perform a larger amount of data processing by the edge computing node 100 compared to the opposite case.

In addition, as the service speed required for the particular service is faster, the distribution policy may be set to perform a larger amount of data processing by the edge computing node 100 compared to the opposite case.

That is, the present disclosure may provide a management framework which can control the cloud service to be performed by setting the distribution policy.

Figure 4:
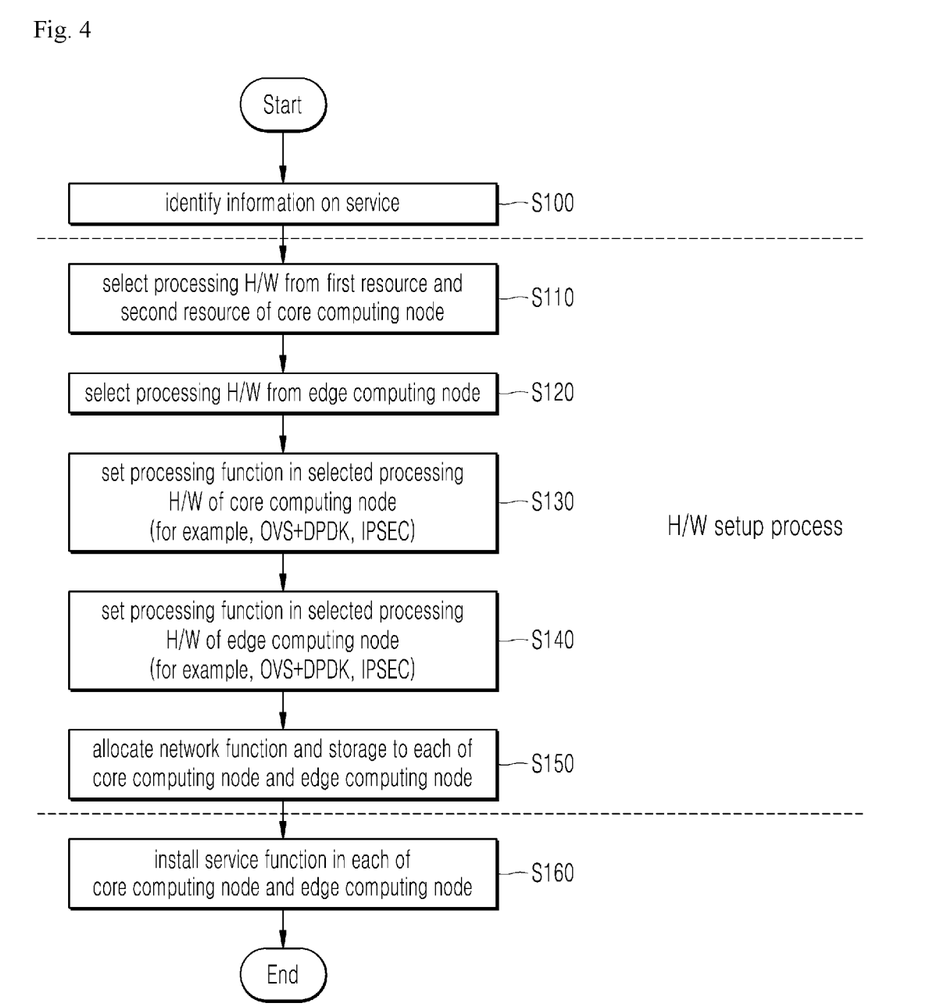
FIG. 4 is a control flowchart illustrating a method of operating a distributed computing acceleration platform according to an embodiment of the present disclosure.

Hereinafter, a method of operating a distributed computing acceleration platform according to an embodiment of the present disclosure will be described with reference to FIG. 4.

For convenience of description, corresponding reference numerals of the elements illustrated in FIG. 3 will be used herein.

In the method of operating the distributed computing acceleration platform according to an embodiment of the present disclosure, information for implementing a server for a particular service, that is, information on the particular service (hereinafter, referred to as service setting information), may be provided and identified in S100.

The service setting information may include information on functions required for implementing the particular service. For example, The service setting information may include all pieces of information for implementing the particular service, such as HW capability information indicating how many and what processors are selected in the core computing node 200 and the edge computing node 100 and how each processor is set, and universal HW setting information suitable for the HW capability.

In the method of operating the distributed computing acceleration platform according to an embodiment of the present disclosure, hardware resources for implementing the server (particular service) are designed (set) and software service implementation is performed on the basis of the service setting information identified in S100.

Specifically, in the method of operating the distributed computing acceleration platform according to an embodiment of the present disclosure, processors, that is, processing H/W, is selected from the core computing node 200 and the edge computing node 100 on the basis of the service setting information.

That is, in the method of operating the distributed computing acceleration platform according to an embodiment of the present disclosure, on the basis of the required function of the particular service identified on the basis of the service setting information in S110, at least one processor, that is, processing H/W, is selected from the first resource 201 and the second resource 202 of the core computing node 200 and at least one processor, that is, processing H/W, is selected from the edge computing node 100 in S120.

In FIG. 3, the FPGA card 210 is selected from the first resource 201 of the core computing node 200 as processing H/W and the FPGA card 110 is selected from the edge computing node 100 as processing H/W.

In the method of operating the distributed computing acceleration platform according to an embodiment of the present disclosure, a particular processing function for the particular service is set in the selected processor, that is, the FPGA card 210 of the core computing node 200 and the selected processor, that is, the FPGA card 110 of the edge computing node 100.

That is, in the method of operating the distributed computing acceleration platform according to an embodiment of the present disclosure, at least one of the first processing function (for example, OVS or OVS+DPDK) for processing acceleration, the second processing function (for example, IPSEC) for security between the core computing node 200 and the edge computing node 100, and the third processing function (for example, ML or DL) for voluminous data processing may be set in at least one processor, that is, the FPGA card 210 selected from the first resource 201 of the core computing node 200 according to the required function of the particular service in S130.

Further, in the method of operating the distributed computing acceleration platform according to an embodiment of the present disclosure, when the processor is selected from the second resource 202 of the core computing node 200, at least one processor selected from the second resource 202, that is, the GPU card, may be used for setting a voluminous data processing engine according to ML or DL set in the FPGA card of the first resource 201.

At this time, according to an embodiment of the present disclosure, when the processing function is set in the FPGA card or the GPU card in the core computing node 200, the core computing node 200 may acquire the IP image of the corresponding processing function stored in the global storage space 250 and set the corresponding processing function. Alternatively, the core computing node 200 may set up the workload of the corresponding processing function.

In addition, in the method of operating the distributed computing acceleration platform according to an embodiment of the present disclosure, at least one of the first processing function (for example, OVS or OVS+DPDK) for processing acceleration and the second processing function (for example, IPSEC) for security between the core computing node 200 and the edge computing node 100 may be set in at least one processor, that is, the FPGA card 110 selected from the edge computing node 100 according to the function of requiring the particular service.

At this time, according to an embodiment of the present disclosure, when the processing function is set in the FPGA card or the GPU card in the edge computing node 100, the edge computing node 100 may acquire the IP image of the corresponding processing function stored in the local storage space 150 and set the corresponding processing function. Alternatively, the edge computing node 100 may set up the workload of the corresponding processing function.

Meanwhile, when the IP image of the corresponding processing function is not stored in the local storage space 150, the IP image of the corresponding processing function and/or the workload of the corresponding processing function is controlled to move from the global storage space 250 to the local storage space 150. Then the edge computing node 100 is controlled to acquire the IP image of the corresponding processing function stored in the local storage space 150 and set the corresponding processing function. Alternatively, the edge computing node 100 may set up the workload of the corresponding processing function.

In FIG. 3, it is assumed as an example that OVS+DPDK 210*a* and IPSEC 210*b* are set in the FPGA card 210 selected from the first resource 201 of the core computing node 200 and that OVS+DPDK 110*a* and IPSEC 110*b* are set in the FPGA card 110 selected from the edge computing node 100.

According to an embodiment of the present disclosure, through S110 to S140 described above, hardware resources of the server implemented in the core computing node 200 and the edge computing node 100 may be flexibly and variously designed (set) on the basis of the hardware resource pool with a structure that can be operated in a various manner, rather than statically.

Further, in the method of operating the distributed computing acceleration platform according to an embodiment of the present disclosure, when hardware resources are designed by setting the particular processing function in the processors of the core computing node 200 and the edge computing node 100 as described above in S130 and S140, the service function operated on the set particular processing function is implemented, and thus a service environment in which the particular service is distributedly implemented in the core computing node 200 and the edge computing node 100 is provided.

Specifically, in the method of operating the distributed computing acceleration platform according to an embodiment of the present disclosure, the network function and the storages 130 and 230 for the particular service are allocated to the core computing node 200 and the edge computing node 100, respectively, in S150.

That is, in the method of operating the distributed computing acceleration platform according to an embodiment of the present disclosure, the network function and the storage function may be allocated to each of the core computing node 200 and the edge computing node 100. The network function is for allowing each of the core computing node 200 and the edge computing node 100 to perform network communication for providing the particular service. The storage function is for supporting a link between the network communication and the storage space 150 or 250.

Further, in the method of operating the distributed computing acceleration platform according to an embodiment of the present disclosure, the service function to be operated using the network function and the storage on the particular processing function are installed in each of the core computing node 200 and the edge computing node 100 in S160.

Specifically, in the method of operating the distributed computing acceleration platform according to an embodiment of the present disclosure, the service function 240 to be operated using the network function and the storage 230 on the particular processing function, that is, OVS+DPDK 210a and IPSEC 210b of the FPGA card 210, is installed in the core computing node 200.

In FIG. 3, most services for providing the particular service, a Virtual Private Network (VPN), Load Balancing (LB) are installed as the service function 240 to be operated using the network function and the storage 230 on OVS+ DPDK 210a and IPSEC 210b of the FPGA card 210.

Further, in the method of operating the distributed computing acceleration platform according to an embodiment of the present disclosure, the service function 140 to be operated using the network function and the storage 130 on the particular processing function, that is, OVS+DPDK 110a and IPSEC 110b of the FPGA card 110, is installed in the edge computing node 100.

In FIG. 3, Mobile Edge Computing (MEC), Virtual Evolved Packet Core (vEPC), and VPN are installed as the service function 140 to be operated using the network function and the storage 130 on OVS+DPDK 110a and IPSEC 110b of the FPGA card 110.

As described above, according to an embodiment of the present disclosure, it is possible to flexibly and variously design (set) hardware resources for the server (particular service) implemented on the basis of a hardware resource pool with a structure that can be operated in a various manner, rather than statically. In addition, according to an embodiment of the present disclosure, service functions may be implemented on the flexibly designed hardware resources.

According to an embodiment of the present disclosure, it is possible to provide a distributed cloud service environment distributedly realized in the core computing node 200 and the edge computing node 100 by designing flexible hardware resources and implementing flexible services (service functions).

Then, according to the present disclosure, it is possible to flexibly and variously design (set) hardware resources and accelerate network offload and computations such as processing/calculations based on a design (setting), unlike the conventional cloud service environment, in which hardware resources are fixed, so that the distributed cloud service environment may implement more innovative computing acceleration and accommodate the Ultra-Reliable Low-Latency communications (URLLC) scenario of 5G.

As described above, the method of operating the distributed computing acceleration platform according to the present disclosure can be implemented in the form of program instructions which are executed through various computer means and thus can be recorded in a computer-readable medium. The computer readable medium may include a program command, a data file, a data structure, and the like independently or in combination. The program command recorded in the medium may be things specially designed and configured for the present disclosure, or things that are well known to and can be used by those skilled in the computer software related art. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware device may be configured to operate as one or more software modules in order to perform operations of the present disclosure, and vice versa.

Although the present disclosure has been described in detail with reference to exemplary embodiments, the present disclosure is not limited thereto and it is apparent to those skilled in the art that various modifications and changes can be made thereto without departing from the scope of the present disclosure.

What is claimed is:

1. An apparatus for a distributed computing acceleration platform, the apparatus comprising:
an edge computing node comprising a processor and a first data storage configured to store a first data set for performing a plurality of processing functions by the processor;
a core computing node comprising
a first resource including a plurality of processing-dedicated processors,
a second resource including a plurality of high-speed operation processors, and
a second storage configured to store a second data set for performing the plurality of processing functions by the plurality of processing-dedicated processors; and
a control node configured to implement a particular service, using a particular processing function among the plurality of processing functions, in the core computing node and the edge computing node,
wherein the control node is configured to
set the particular processing function for the particular service in the processor of the edge computing node by loading the first data set from the first storage and in at least one of the plurality of processing dedicated processors of the first resource by loading the second data set from the second storage and
implement a service function to be operated on the particular processing function,
wherein the edge computing node is configured to select a portion of data generated for the particular service, perform processing of the portion of data, and transfer data other than the portion of data to the core computing node, and
wherein the processing performed by the edge computing node is changed according to a distribution policy set based on a type of the particular service.

2. The apparatus of claim 1, wherein the processor of edge computing node comprises a processing-dedicated Field-Programmable Gate Array (FPGA) card, of which the particular processing function is configured to be reset, and a high-speed-operation Graphic Processing Unit (GPU).

3. The apparatus of claim 1, wherein
the first resource includes a plurality of processing-dedicated FPGA cards of which the processing function is configured to be reset and has a fabric structure in which each FPGA card is selectively connected to at least one other FPGA card, and the second resource has a cluster structure including a plurality of high-speed operation GPU cards.

4. The apparatus of claim 1, wherein the control node is configured to set, in the processor of the edge computing node and the at least one of the plurality of processing dedicated processors of the first resource of the core computing node, at least one of a first processing function for processing acceleration, a second processing function for security between the core computing node and the edge computing node, and a third processing function for processing voluminous data.

5. The apparatus of claim 4, wherein the control node is configured to set at least one processor in a high-speed operation processor among the plurality of high-speed operation processors of the second resource of the core computing node for high-speed operation of voluminous data processing according to the third processing function.

6. A method of operating a distributed computing acceleration platform having an edge computing node comprising a plurality of processors and a first data storage configured to store a first data set for performing a plurality of processing functions by the processors, a core computing node comprising a first resource including a plurality of processing-dedicated processors, a second resource including a plurality of high-speed operation processors, and a second storage configured to store a second data set for performing the plurality of processing functions by the plurality of processing-dedicated processors, and a control node configured to implement a particular service, using a particular processing function among the plurality of processing functions, in the core computing node and the edge computing node, the method comprising:

identifying information on the particular service;

selecting processors from the core computing node and the edge computing node based on the identified information on the particular service;

setting the particular processing function for the particular service in the processing-dedicated processor selected from the core computing node by loading the second data set from the second storage and in the processor selected from the edge computing node by loading the first data set from the first storage and reset the particular processing function; and implementing the particular service in the core computing node and the edge computing node by implementing a service function to be operated on the particular processing function, wherein the edge computing node is configured to select a portion of data generated for the particular service, perform processing of the portion of data, and transfer data other than the portion of data to the core computing node, and wherein the processing performed by the edge computing node is changed according to a distribution policy set based on a type of the particular service.

7. The method of claim 6, wherein the setting comprises:

setting, in the processor of the edge computing node and the at least one of the plurality of processing dedicated processors of the first resource of the core computing node, at least one of a first processing function for processing acceleration, a second processing function for security between the core computing node and the edge computing node, and a third processing function for processing voluminous data; and setting a high-speed operation processor selected from the plurality of high-speed operation processors of the second resource of the core computing node for high-speed operation of voluminous data processing according to the third processing function.

8. The method of claim 6, wherein the setting step comprises:

setting at least one of a first processing function for processing acceleration and a second processing function for security between the core computing node and the edge computing node in the processor selected from the edge computing node.

9. The method of claim 6, wherein the implementing comprises:

allocating a network function and a storage for the particular service to each of the core computing node and the edge computing node; and installing a service function to be operated using the network function and the storage on the particular processing function in each of the core computing node and the edge computing node.

* * * * *